June 18, 1957   W. E. STINGER   2,796,457
R-F GASKET FOR RADIO INTERFERENCE ATTENUATION
Filed June 23, 1952
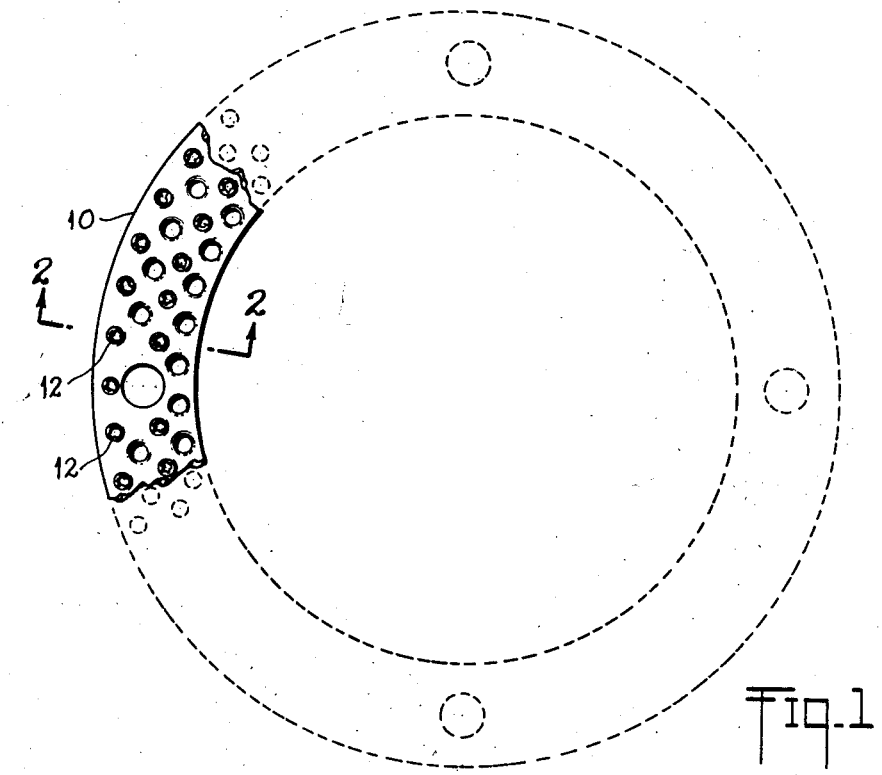
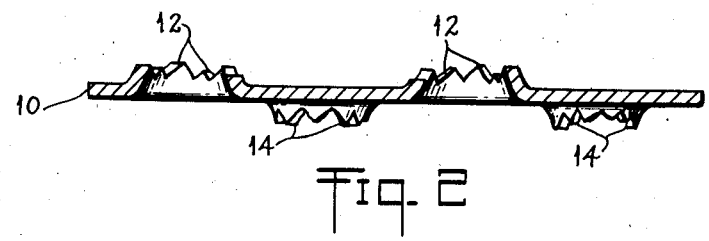
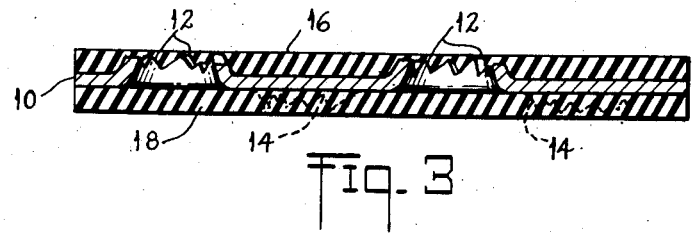
INVENTOR.
WALTER E. STINGER
BY
*Roderick B Jones*
ATTORNEY United States Patent Office 2,796,457
Patented June 18, 1957

2,796,457
R-F GASKET FOR RADIO INTERFERENCE ATTENUATION

Walter E. Stinger, Wayne, Pa.

Application June 23, 1952, Serial No. 295,140

1 Claim. (Cl. 174—35)

(Granted under Title 35, U. S. Code (1952), sec. 266)

The invention described herein may be manufactured and used by or for the Government of the United States of America for governmental purposes without the payment of any royalties thereon or therefor.

This invention relates to gaskets and is directed particularly to electrically conductive gaskets of the type used in shielding spurious radio-frequency energy sources to prevent interference with radio intelligence systems. Such gaskets find application, for instance, between the metal body and cap members of aircraft magnetos to minimize the leakage of radio-frequency energy caused by the usual sparking within the magnetos.

Heretofore, conducting gaskets were commonly constructed either of wire mesh impregnated with a plastic material, or a plastic ring, generally of circular cross-section, over which was woven a tinned copper braid. Gaskets so constructed proved to be unsatisfactory for the reason that corrosion or oxidation of the metal resulted in poor electrical connection to the clamped surfaces. Furthermore, it was necessary to clean and polish the joined surfaces in order to insure conduction through the gasket. Moreover, since the conductive material of such gaskets is non-penetrating and therefore not capable of piercing through thin layers of insulation even when subjected to great pressure, they could not be used in joining anodized surfaces.

Accordingly, it is one object of this invention to provide a conducting gasket the efficiency in attenuating radio-frequency energy of which is not affected by oxidation or corrosion.

It is another object to provide a gasket of the character described having sharp metallic points capable of penetrating anodizing or any other coating that may be applied to the joined surfaces for protection against corrosion.

It is another object to provide a gasket of the character described that can be coated with rubber or similar resilient material to provide an air-tight seam where required, as in the case of pressurizing, without interfering with its efficiency as a radio-frequency attenuator.

It is another object to provide a gasket of the character described that can be reused many times without loss of efficiency.

It is another object to provide a gasket of the above nature that does not require a large amount of compressional clamping force to insure good electrical conduction.

Other objects and many of the attendant advantages of this invention will be readily appreciated as the same becomes better understood by reference to the following detailed description when considered in connection with the accompanying drawings wherein:

Fig. 1 is a plan view of the improved conducting gasket embodying the invention;

Fig. 2 is an enlarged vertical cross-sectional view thereof, taken along the line 2—2 of Fig. 1, and Fig. 3 illustrates, in an enlarged cross-sectional view similar to that of Fig. 2, a modification of the invention adapting it for use in achieving air-tight joints, as in the case where pressurizing is required.

In the drawing, wherein like reference numerals denote corresponding parts throughout the several views, the number 10 designates a ring of resilient metal, such as beryllium-copper or Phosphor bronze, comprising the body of the improved gasket. Although the metal ring 10 is illustrated as being circular, it will be understood that it could be of any other shape conforming to the contour of the mating surfaces to be joined. The upper and lower surfaces of the metal ring 10 are punched, as by means of a pointed instrument, to provide a plurality of protrusions having upwardly-extending jagged edges 12 and a plurality of protrusions having downwardly-extending jagged edges 14.

Preferably, there are a sufficient number of protrusions punched, and the spacing pattern of the protrusions is such that one or more of said jagged edges will intercept any straight line extending edgewise through the gasket. Moreover, the upwardly pierced and downwardly pierced protrusions preferably are substantially equally distributed, respectively, over the upper and lower surfaces. Thus, in the embodiment illustrated in the drawing, the punchings conform to concentric curves parallel with the contour of the gasket, the protrusions along adjacent curves being reversely pierced.

Fig. 3 illustrates a modification of the improved gasket shown in Figs. 1 and 2 wherein upper and lower layers 16, 18 of rubber or other resilient sealing material are fixed against the surfaces of the gasket to provide an impervious seal between the gasketed surfaces.

In use, the improved gasket, by virtue of its hard jagged edges 12, 14, makes positive contact with the metallic mated surfaces between which it is clamped, insuring low-resistance electrical connection thereto, whereby spurious radiation directed against the inner edge of the gasket is attenuated or grounded to prevent its radiation therethrough. As hereinabove explained, the jagged edges are sufficient in number and so closely spaced as to afford complete electrical shielding.

For the modification shown in Fig. 3, the jagged edges 12, 14 readily pierce the rubber layers 16, 18 to make contact with the gasketed surfaces, thereby providing complete electrical shielding as well as a hermetic seal.

Obviously, many modifications and variations of the present invention are possible in the light of the above teachings. It is therefore to be understood that within the scope of the appended claims the invention can be practiced otherwise than as specifically described.

I claim:

A gasket for joining the mating surfaces of two electrical conductors so as to provide a low-impedance path for radio-frequency energy, said gasket being formed so a flat metallic ring having a plurality of protrusions therein, the protrusions being so made as to have jagged edges extending away from each surface of the ring and adapted to make a pressure contact with the respective mating surfaces of the electrical conductors between which the gasket is positioned, the upper and lower surfaces of the metallic ring being coated with a resilient material adapted to form a gas-tight connection between the two conductors without precluding penetration through the resilient material of the said jagged edges, thereby to maintain the electrical properties of the assembly, said plurality of protrusions being of such number and so distributed on said flat metallic ring that one or more of the jagged edges thereof will intercept any straight line extending edgewise through said gasket.

(References on following page)

References Cited in the file of this patent

UNITED STATES PATENTS

| | | |
|---|---|---|
| 1,700,561 | Commin et al. | Jan. 29, 1929 |
| 1,927,450 | Balfe | Sept. 19, 1933 |
| 2,250,280 | Starbird | July 22, 1941 |
| 2,444,914 | Brennan | July 13, 1948 |
| 2,454,567 | Pierson | Nov. 23, 1948 |
| 2,477,267 | Robinson | July 26, 1949 |
| 2,597,081 | Goodhue | May 20, 1952 |

FOREIGN PATENTS

| | | |
|---|---|---|
| 244,816 | Great Britain | Dec. 18, 1925 |
| 840,491 | Germany | June 3, 1952 |